(12) United States Patent
Karlsson et al.

(10) Patent No.: US 11,758,410 B2
(45) Date of Patent: Sep. 12, 2023

(54) WIRELESS COMMUNICATION SYSTEM FOR GROUND BASED VEHICLES

(71) Applicant: ICOMERA AB, Gothenburg (SE)

(72) Inventors: Mats Karlsson, Vålberg (SE); Rikard Reinhagen, Gothenburg (SE)

(73) Assignee: ICOMERA AB, Gothenburg (SE)

( * ) Notice: Subject to any disclaimer, the term of this patent is extended or adjusted under 35 U.S.C. 154(b) by 0 days.

(21) Appl. No.: 16/814,949

(22) Filed: Mar. 10, 2020

(65) Prior Publication Data

US 2020/0296600 A1    Sep. 17, 2020

(30) Foreign Application Priority Data

Mar. 15, 2019 (SE) .................................... 1950326-7

(51) Int. Cl.
*H04W 16/28* (2009.01)
*H04W 4/40* (2018.01)
*H04B 7/0413* (2017.01)

(52) U.S. Cl.
CPC .......... *H04W 16/28* (2013.01); *H04B 7/0413* (2013.01); *H04W 4/40* (2018.02)

(58) Field of Classification Search
CPC ..... H04W 16/28; H04W 4/40; H04W 84/005; H04B 7/0413; H04B 7/10; H04B 7/0408; H04B 7/0617; H04B 7/0491; H01Q 1/3283; H01Q 25/005; H01Q 1/3275; H01Q 21/29; H01Q 1/325; H01Q 1/3216; B61L 25/025; B61L 15/0027; B61L 25/02
See application file for complete search history.

(56) References Cited

U.S. PATENT DOCUMENTS 5,712,645 A  *  1/1998  Jellum ................. H01Q 1/1271
                                                                    343/711
10,292,058 B2 *  5/2019  Ansari ..................... H01Q 1/32
(Continued)

FOREIGN PATENT DOCUMENTS

CN          103552571 A  *  2/2014
CN          106533525 A  *  3/2017
(Continued)

OTHER PUBLICATIONS

European Search Report issued by European Patent Office (EPO) published on Jun. 19, 2020 regarding European application No. 20162190.1, Munich, Germany.

*Primary Examiner* — Tejis Daya
(74) *Attorney, Agent, or Firm* — AVEK IP, LLC

(57) ABSTRACT

A wireless communication system for a ground based vehicle, such as a train, is disclosed. In an embodiment, the system includes a router connected to a plurality of antennas. The router is configured to transmit and receive a wireless data communication to and from a stationary communication server outside the ground based vehicle through at least one base station of an exterior mobile network via the plurality of antennas. The plurality of antennas are directional antennas arranged on planes of the vehicle functioning as ground planes, isolating planes, or absorbing planes. Each plane extends in a height direction or a length direction of the ground based vehicle. At least one antenna's beam covers a laterally directed sector to a first side of the vehicle, and at least one antenna's beam covers a laterally directed sector to a second side of the vehicle.

18 Claims, 5 Drawing Sheets

(56) References Cited

U.S. PATENT DOCUMENTS

| | | | | |
|---|---|---|---|---|
| 2004/0196834 A1* | 10/2004 | Ofek | ............... | H01Q 21/065 |
| | | | | 370/352 |
| 2010/0315301 A1* | 12/2010 | Marten | ............... | H01Q 1/42 |
| | | | | 174/59 |
| 2016/0249233 A1* | 8/2016 | Murray | ............... | H04W 16/26 |
| 2017/0214128 A1* | 7/2017 | Karlsson | ............ | H01Q 1/1271 |
| 2018/0367209 A1* | 12/2018 | Jamaly | ............... | H04B 7/024 |
| 2021/0242578 A1* | 8/2021 | Inomata | ............ | H01Q 13/206 |
| 2022/0294105 A1* | 9/2022 | Song | ............... | H01Q 1/3291 |

FOREIGN PATENT DOCUMENTS

| | | | | |
|---|---|---|---|---|
| JP | 2019021978 A | 2/2019 | | |
| WO | WO-2019074428 A1 * | 4/2019 | ............ | F16B 2/065 |
| WO | WO-2020006127 A1 * | 1/2020 | ......... | B60R 11/0264 |

* cited by examiner

WIRELESS COMMUNICATION SYSTEM FOR GROUND BASED VEHICLES

CROSS REFERENCE TO RELATED APPLICATIONS

This application claims priority to Swedish application number 1950326-7, filed on Mar. 15, 2019, the disclosure of which is incorporated by reference herein in its entirety.

FIELD OF THE DISCLOSURE

The disclosure relates generally to a wireless communication technology. More specifically, the disclosure relates to a wireless communication system and method for ground based vehicles, such as trains.

BACKGROUND

The last few decades have introduced vast improvements and advancements in the field of communication technology. In fact, the advent of the internet, cellular phones, and more recently smart phones and tablets has greatly changed the way we communicate and quite possibly accelerated the technological field surrounding these devices. As an inevitable consequence, there is an ever-increasing demand for bandwidth to satisfy the market need for online connectivity which results in an increased focus on constantly developing and improving the underlying technology and systems in order to accommodate this demand.

Further, there is a rapidly increasing demand from consumers to communicate through mobile phones and other handheld terminals at all times, even while traveling on trains, buses, ships, et cetera.

Specifically, communication problems present in moving ground based vehicles, especially when multiple users/clients travel together on larger vehicles, and at relatively high speed on trains, buses, ships, et cetera. At the same time, there is currently an increasing demand from passengers to communicate through mobile phones and other handheld terminals when travelling on trains, and also to get access to the Internet via laptops, tablets, PDAs, et cetera. Further, new mobile devices (e.g., smartphones) in generally require operating software applications continuously. In other words, they are active at all times. As a result, many handovers are required when a user uses such device on a moving train. Even though this problem is common for all moving vehicles, it is especially pronounced for vehicles moving at high speed, such as trains and airplanes.

EP 1 175 757 and EP 2 943 011 by the same applicant describe two methods whereby many of these weaknesses resulting from wireless communication may be overcome through the concurrent use of multiple wireless links. Optimizations can hereby be based on e.g. latency, bandwidth, and other performance parameters, but also on e.g. cost. However, the aforementioned solutions are at times insufficient to obtain an optimal transmission performance and the required transmission capacity. Trains and other moving vehicles often pass through areas with bad radio coverage, and especially in such areas, the present solutions may at times be unable to handle the required traffic.

There is therefore a need for an improved method and system for communication of moving trains with increased capacity, capacity utilization, quality, and/or cost-efficiency. Even though the above discussion is focused on trains, similar situations and problems are encountered in many other types of moving ground based vehicles, and in particular moving public transportation vehicles, such as buses, ships, et cetera.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a wireless communication system for a ground based vehicle. The wireless communication system includes a router connected to a plurality of antennas. The router is configured to transmit and receive a wireless data communication to and from a stationary communication server outside the ground based vehicle through at least one base station of an exterior mobile network via the plurality of antennas. The plurality of antennas are directional antennas arranged on planes of the ground based vehicle functioning as ground planes, isolating planes, or absorbing planes. Each plane extends in a height direction and/or a length direction of the ground based vehicle. At least one of the plurality of antennas is directed so that its antenna beam covers a laterally directed sector to a first side of the ground based vehicle. At least another one of the plurality of antennas is directed so that its antenna beam covers a laterally directed sector to a second side of the ground based vehicle. The second side is opposite to the first side.

Optionally, the planes of the ground based vehicle are provided at exterior side walls.

Optionally, the planes of the ground based vehicle are provided on sides of an elongate structure extending in a length direction of the ground based vehicle, such as a longitudinal beam.

Optionally, the antennas are cross-polarized, thereby simultaneously transmitting and receiving in two different polarizations.

Optionally, the antennas are provided with fixed antenna beam directions.

Optionally, the antennas are patch antennas with orthogonal polarizations, such as vertical and horizontal polarizations or +/−45 degrees dual slant orientations.

Optionally, the antennas have steerable antenna beams.
Optionally, the antennas are phased array antennas.
Optionally, at least two of the plurality of antennas are directed so that their antenna beams cover laterally directed sectors to the first side of the ground based vehicle; at least another two of the plurality of antennas are directed so that their antenna beams cover laterally directed sectors to the second side of the ground based vehicle; the second side is opposite to the first side; and the laterally directed sectors to the first side of the ground based vehicle and the laterally directed sectors to the second side of the ground based vehicle are at least mostly non-overlapping.

Optionally, the laterally directed sectors to the first side of the ground based vehicle and the laterally directed sectors to the second side of the ground based vehicle are non-overlapping.

Optionally, the router includes a plurality of modems for a communication with at least one exterior mobile network.

Optionally, the router is connected to a plurality of modems for a communication with at least one exterior mobile network.

Optionally, the router includes at least one modem for a communication with the exterior mobile network; and the at least one modem is connectable to at least two of the plurality of antennas to enable a multiple input multiple output (MIMO) communication.

Optionally, the router includes a plurality of modems for a communication with exterior mobile network; and each of the plurality of modems connects to at least two of the plurality of antennas to enable a multiple input multiple output (MIMO) communication.

Optionally, the ground based vehicle is a train.

In other embodiments, the disclosure provides a method for enabling a wireless data communication between a wireless communication system in a ground based vehicle and a stationary communication server outside the ground based vehicle including the following steps.

(1) Providing a router within the ground based vehicle, the router being connected to a plurality of directional antennas and configured to transmit and receive a wireless data communication to and from the stationary communication server outside the ground based vehicle through at least one base station via the plurality of directional antennas.

(2) Providing the plurality of directional antennas on planes of the ground based vehicle functioning as ground planes, isolating planes, or absorbing planes. Each plane extends in a height direction and/or a length direction of the ground based vehicle.

(3) Directing at least one of the plurality of directional antennas so that its antenna beam covers a laterally directed sector to a first side of the ground based vehicle.

(4) Directing at least another one of the plurality of directional antennas so that its antenna beam covers a laterally directed sector to a second side of the ground based vehicle. The second side is opposite to the first side.

BRIEF DESCRIPTION OF THE DRAWINGS

Illustrative embodiments of the present disclosure are described in detail below with reference to the attached drawing figures.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

While the following embodiments are related to a train, a person of ordinary skill in the art would understand that similar methods and systems may be implemented on other moving vehicles such as buses, ships, et cetera. The ground based vehicle may be a train, especially a high-speed train.

Figure 1:
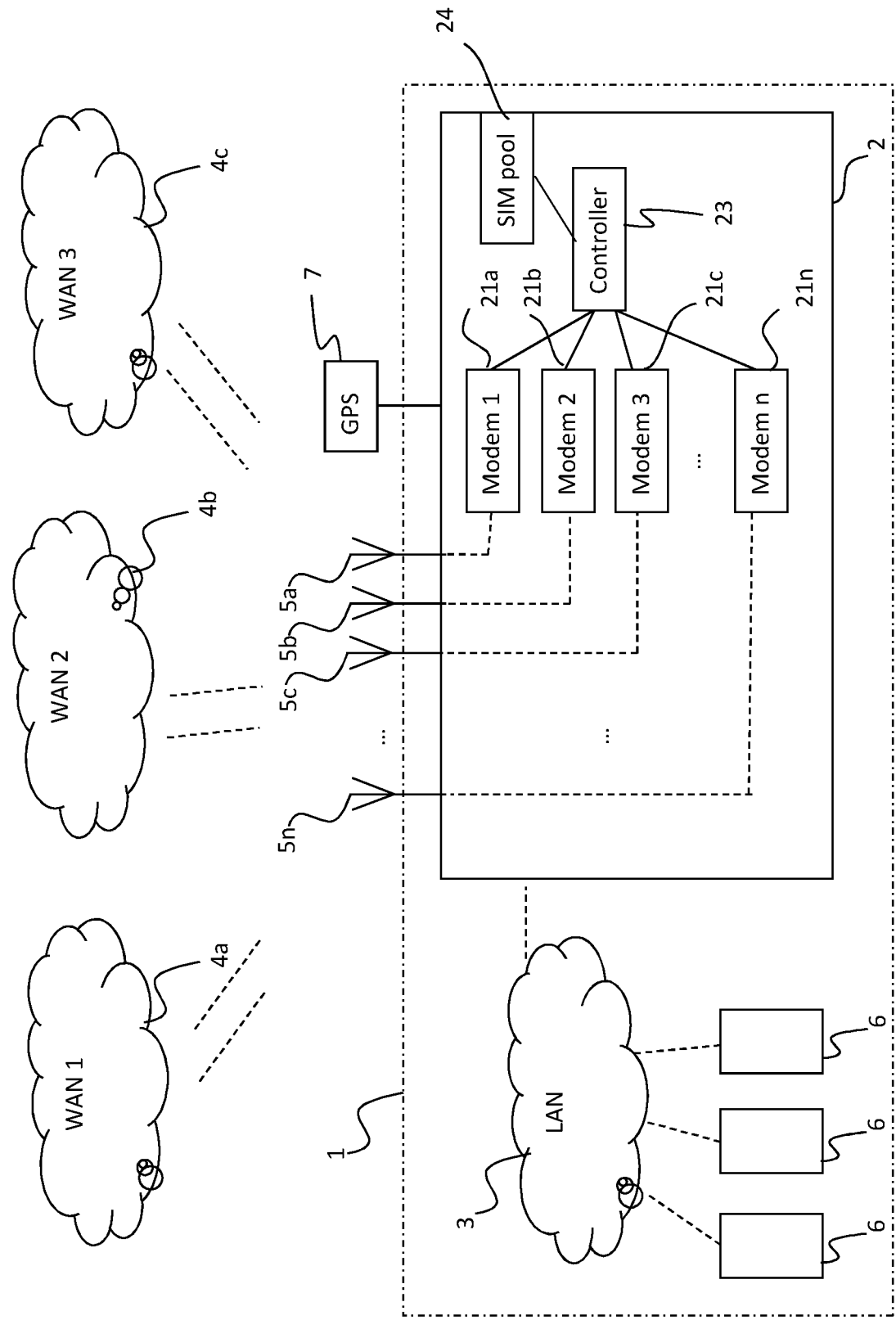
FIG. 1 is a schematic illustration of a train having a wireless communication system according to an embodiment of the disclosure.

Referring first to FIG. 1, a communication system of a rail-bound vehicle 1 (e.g., a train) may include a data communication router 2 for receiving and transmitting data between an internal local area network (LAN) 3 and one or more external wide area networks (WANs) 4a, 4b, 4c. Communication to and from the WANs is provided through one or several antennas 5 *a-n* on the vehicle roof. Two or more data links are available, either between the train and one of the WANs and/or by using several WANs simultaneously.

The LAN 3 may be a wireless network which may communicate with terminal units 6 within the vehicle by one or several internal antennas to. Optionally, the LAN 3 may be a wired network. Optionally, the LAN 3 may be set-up as wireless access point(s). The client(s) 6 may be computing devices such as laptops, mobiles telephones, PDAs, tablets, et cetera.

The data communication router 2 may include a plurality of modems 21 *a-n*. Assignment of data streams to different WANs and/or to different data links on one WAN is controlled by a controller 23. The router controller 23 may be configured partially or fully as a software controlled processor, a hardware controlled processor, or a mix of the two. The data communication router 2 may also be denominated MAR (Mobile Access Router) or MAAR (Mobile Access and Applications Router).

The system may also include a global positioning system (GPS) receiver 7 for receiving GPS signals indicative of the current position of the vehicle, and wherein the controller may be arranged to assign data streams to various data links also partly in dependence on said received GPS signals. While only GPS is included for illustration purpose, the receiver 7 here may be configured to receive signals from other GNSS such as BeiDou Navigation Satellite System (BDS), Galileo System, GLONASS (Globalnaya Navigazionnaya Sputnikovaya Sistema, or Global Navigation Satellite System), Indian Regional Navigation Satellite System (IRNSS), Quasi-Zenith Satellite System (QZSS), et cetera.

The router 2 may be arranged to communicate on several different communication routes (data links) having different characteristics, such as different communication routes to and from the exterior mobile network 4, which may be owned by different network operators or by the same network operator. The various data streams may be transferred and distributed among the plurality of routers on the different data links, based on available bandwidth or other performance parameters as discussed above, and as disclosed in EP 2 943 011 by the same applicant, which is hereby incorporated by reference.

The router 2 may further include a plurality of modems 21a-n. Each antenna 5a-5nc or each antenna orthogonal pair may be assigned and connected to a separate modem 21a-n. In case of the latter, each modem 21a-n may be provided with 2 antenna ports for connection to each orthogonal antenna pair. However, each modem may also be provided with four or more ports for compliance with Multiple Input Multiple Output (MIMO) systems. Moreover, the router 2 may include a subscriber identity module pool (SIM pool) 24 which includes a plurality of SIMs. The control unit 23 may be accordingly configured to periodically assign SIMs within the SIM pool 24 to any one of the plurality of modems 21a-n provided within the router 2. In other words, the SIMs form a common SIM pool 24 may be accessible to all the modems 21a-n. The SIMs are may be SIM cards, and the SIM pool 24 may be implemented as a SIM card holder including a plurality of slots for receiving a plurality of SIM cards.

The assignment of SIMs to modems at every specific time may be determined based on a set of rules in the controller 23. The set of rules may be used to assign SIMs to the modems based on information such as in which country the vehicle is currently travelling, the amount of data that has been conveyed by use of the different SIMs, the current price related to conveying data through the different SIMs, the type of data being conveyed, et cetera.

Furthermore, the router 2 may be configured to receive and transmit data between the internal local area network (LAN) 3 and a plurality of external wide ware networks (WANs) 4a-4c. The LAN 3 may be a wireless network which communicates with clients within the vehicle 1 by one or several internal antennas to. To this end, it is feasible to use a distributed antenna such as a leaky feeder extending through the vehicle, but other types of antennas may also be used. The wireless network may be implemented as a wireless local area network (WLAN), and may operate in compliance with IEEE 802.11 ("Wi-Fi") standards. In such case, one or more access point(s) may be provided in the vehicle. However, such system may also be implemented by a wired network within the vehicle.

Figure 2:
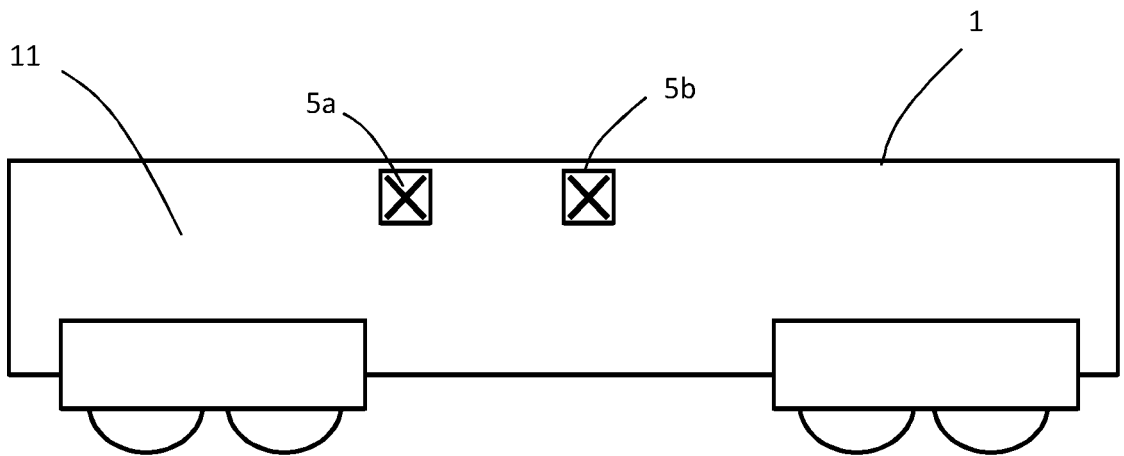
FIG. 2 is a schematic side view of a train having antennas arranged on the side walls according to an embodiment of the disclosure.

FIG. 2 illustrates a schematic side view of a vehicle 1 (e.g., a train) including a wireless communication system. In this embodiment, the antennas may be arranged on the exterior metal sidewall 11 of the vehicle 1. As a result, the sidewall functions as a ground plane, isolating plane, or absorbing plane, which may separate the antenna sectors on different sides of the vehicle from each other. The antennas 5a-5d (of which only 5a and 5b are visible in the figure) may be directional antennas, which may for example be passive beam forming arrays having various polarizations. Each of the antennas 5a-5d may be implemented as an antenna orthogonal pair by a dual polarized antenna setup with a 90-degree angle between two linear polarizations or by circular left-handed and right-handed polarizations. Optionally, thin and cross-polarized patch antennas may be used. The antennas may be arranged on a metal wall of the sidewall, and preferably in an upper part of the vehicle, relatively close to the roof. However, the antennas may also be arranged on other places such as metallized surfaces of windows arranged in the sidewalls.

Figure 3A:
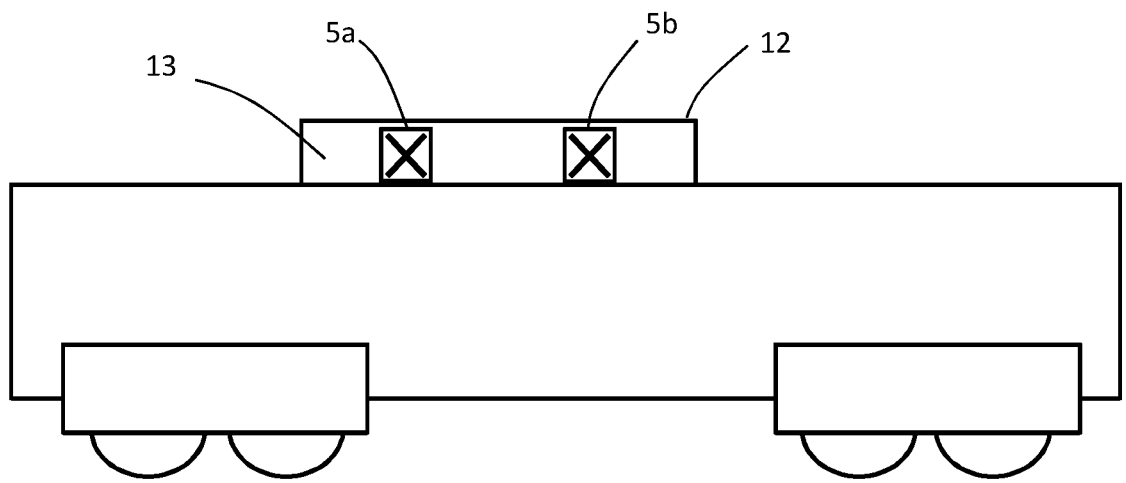
FIG. 3A is a schematic illustration of a side view of a train having antennas arranged on the sides of an elongate beam on the train roof according to an embodiment of the disclosure.
Figure 3B:
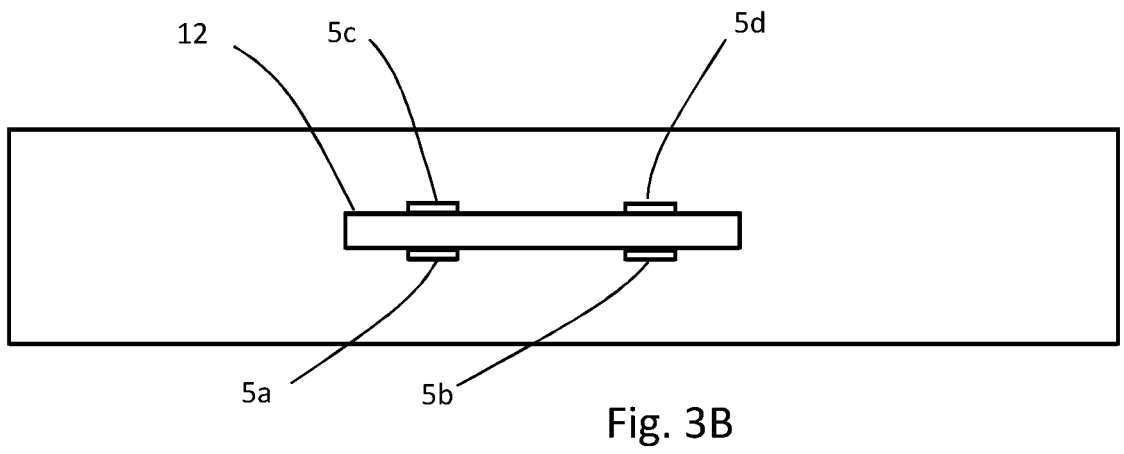
FIG. 3B is a schematic illustration of a top view of a train having antennas arranged on the sides of an elongate beam on the train roof according to an embodiment of the disclosure.

However, it is also feasible to arrange the antennas on other planes of the vehicle functioning as ground planes, isolating planes, or absorbing planes. And the antennas may extend in a height direction and/or a length direction of the vehicle. Optionally, as shown in FIGS. 3A and 3B, the antennas 5a-5d may be arranged on the sides of an elongate structure extending in the length direction of the vehicle. In this example, the structure is formed by a longitudinal beam 12 having generally vertical sides 12 which are made of metal or are metallized and function as a ground plane. However, other types of structures forming vertical ground planes may also be used. Alternatively, the longitudinal beam may be of an absorbing material, or be provided with an absorbing material on the vertical sides. Optionally, the longitudinal beam may be made of a material or structure which functions as an isolator for RF waves.

The antennas may be arranged and directed so that the antenna beam covers a laterally directed sector towards the side of the vehicle on which they are arranged.

Figure 4:
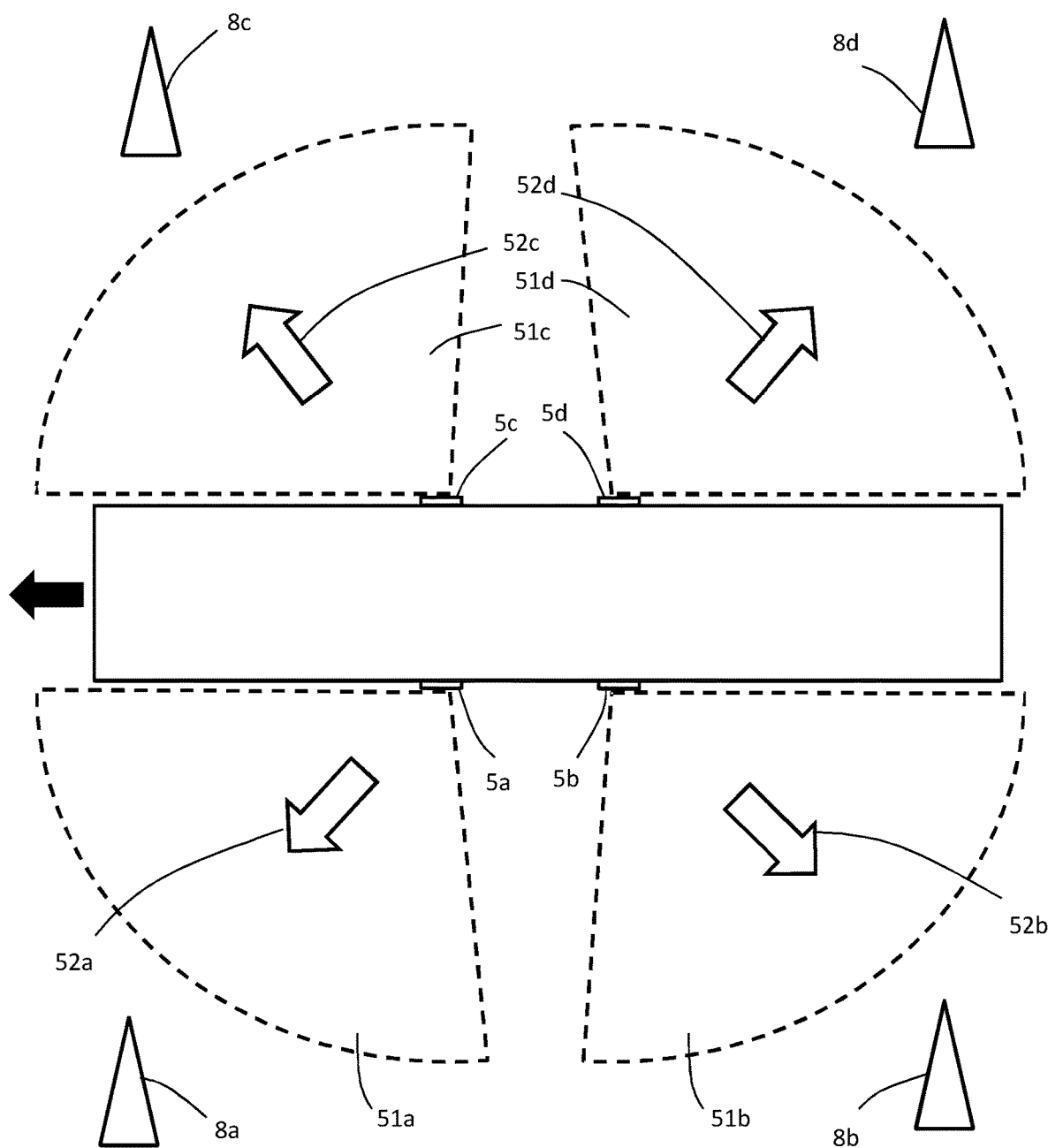
FIG. 4 is a schematic illustration of a top view of general beam directions and antenna sectors for an embodiment having two antennas on each side of the train according to an embodiment of the disclosure.

As shown in FIG. 4, two pairs of antennas (5a & 5b and 5c & 5d) may be formed on two different sides of the vehicle. Each antenna forms an antenna beam covering generally an antenna sector 51a-d of about 90 degrees, but slightly more or slightly less are also feasible. Thus, assuming that the vehicle is travelling to the left in the figure, as illustrated by the arrow in the figure, the antenna 5a may be directed to cover a sector 51a extending to the left and in the forward direction of the vehicle, and the beam direction 52a may generally be directed in the northwest direction, if north is considered to be the travelling direction for the vehicle. Correspondingly, the antenna 5b may be directed to cover a sector 51b extending to the left and in the backward direction of the vehicle, and the beam direction 52b may generally be directed in the southwest direction, the antenna 5c may be directed to cover a sector 51c extending to the right and in the forward direction of the vehicle, and the beam direction 52c may generally be directed in the northeast direction, whereas the antenna 5d may be directed to cover a sector 51d extending to the right and in the backward direction of the vehicle, and the beam direction 52d may generally be directed in the southeast direction. Here, the antenna sectors 51a-d are, at least to a large extent, non-overlapping, making it possible for the antennas 5a-d to connect to different base stations 8a-d independently, and in a non-competing manner.

Figure 5:
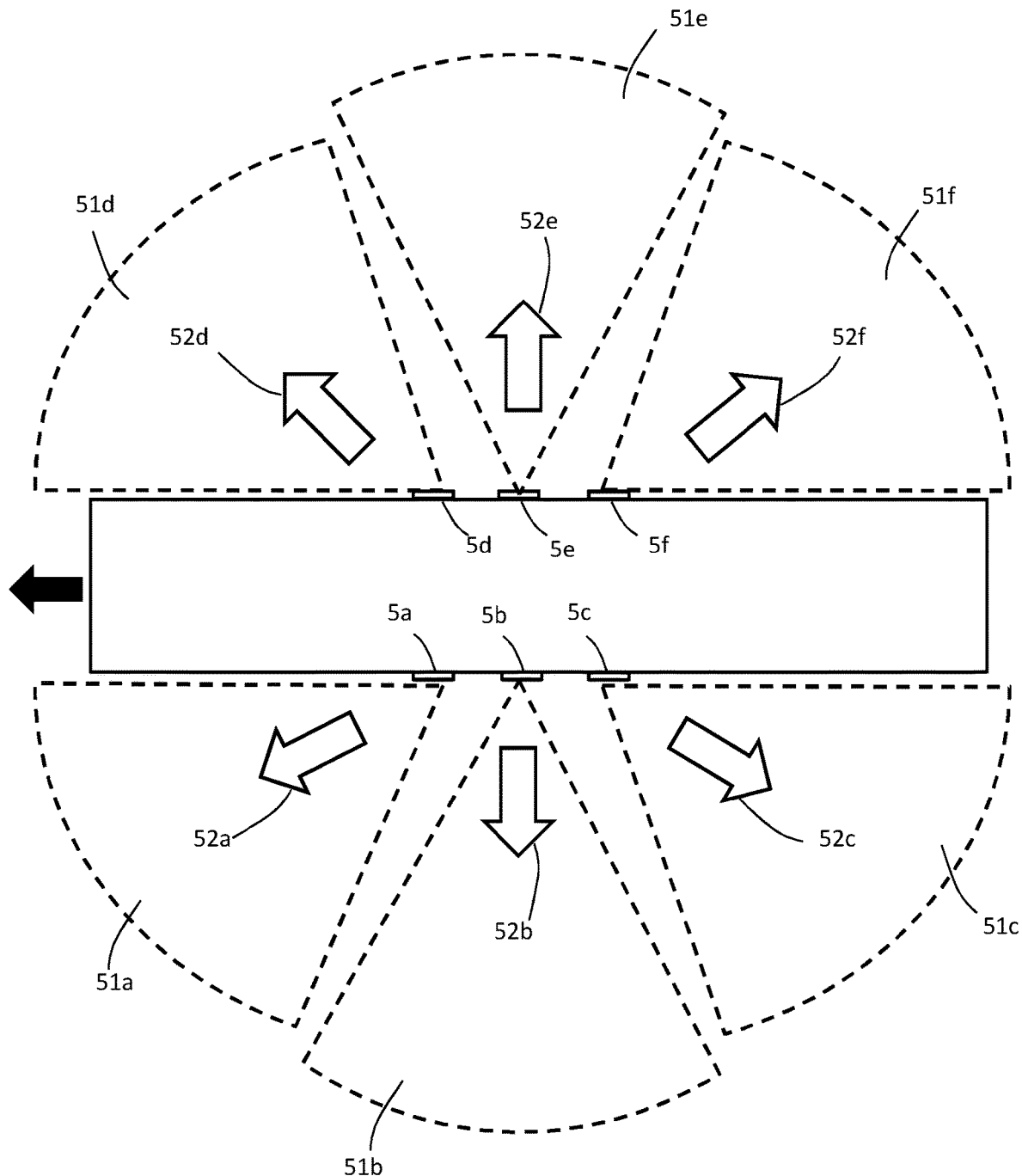
FIG. 5 a schematic illustration of a top view of general beam directions and antenna sectors for an embodiment having three antennas on each side of the train according to an embodiment of the disclosure.

In the illustrative example of FIG. 5, an embodiment having three antennas on each side of the vehicle is shown. In such embodiment, antennas 5a-c may be provided on a first (e.g., left) side of the vehicle, and antennas 5d-f may be provided on a second (e.g., right) side of the vehicle. Similar to the previously discussed embodiment in FIG. 4, the antennas on each side form antenna beams covering antenna sectors together, generally covering the total left-hand side and the total right-hand side with a limited or non-existent overlap. Here, the antenna sectors 51a-f have an opening angle of about 60 degrees. However, slightly more or slightly less degrees may also be feasible.

Assuming that the vehicle is travelling to the left in FIG. 5 as illustrated by the arrow, the antenna 5a may be directed to cover a sector 51a extending to the left and in the forward direction of the vehicle, and the beam direction 52a may generally be directed somewhere between NW and NNW, if north is considered to be the travelling direction for the vehicle. Correspondingly, the antenna 5b may be directed to cover a sector 51b extending generally to the left, and the beam direction 52b may generally be directed west direction, and the antenna 5c may be directed to cover a sector 51c extending to the left and in the backward direction of the vehicle, and the beam direction 52c may generally be directed somewhere between SW and SSW. The antenna sectors provided by the antennas 5d-5f on the other side may be similar, but directed to the right/east instead. Here, the antenna sectors 51a-f are, at least to a large extent, non-overlapping, making it possible for the antennas 5a-f to connect to different base stations independently, and in a non-competing manner. Configurations of more than three antennas on each side may also be provided, in a similar manner.

Figure 6:
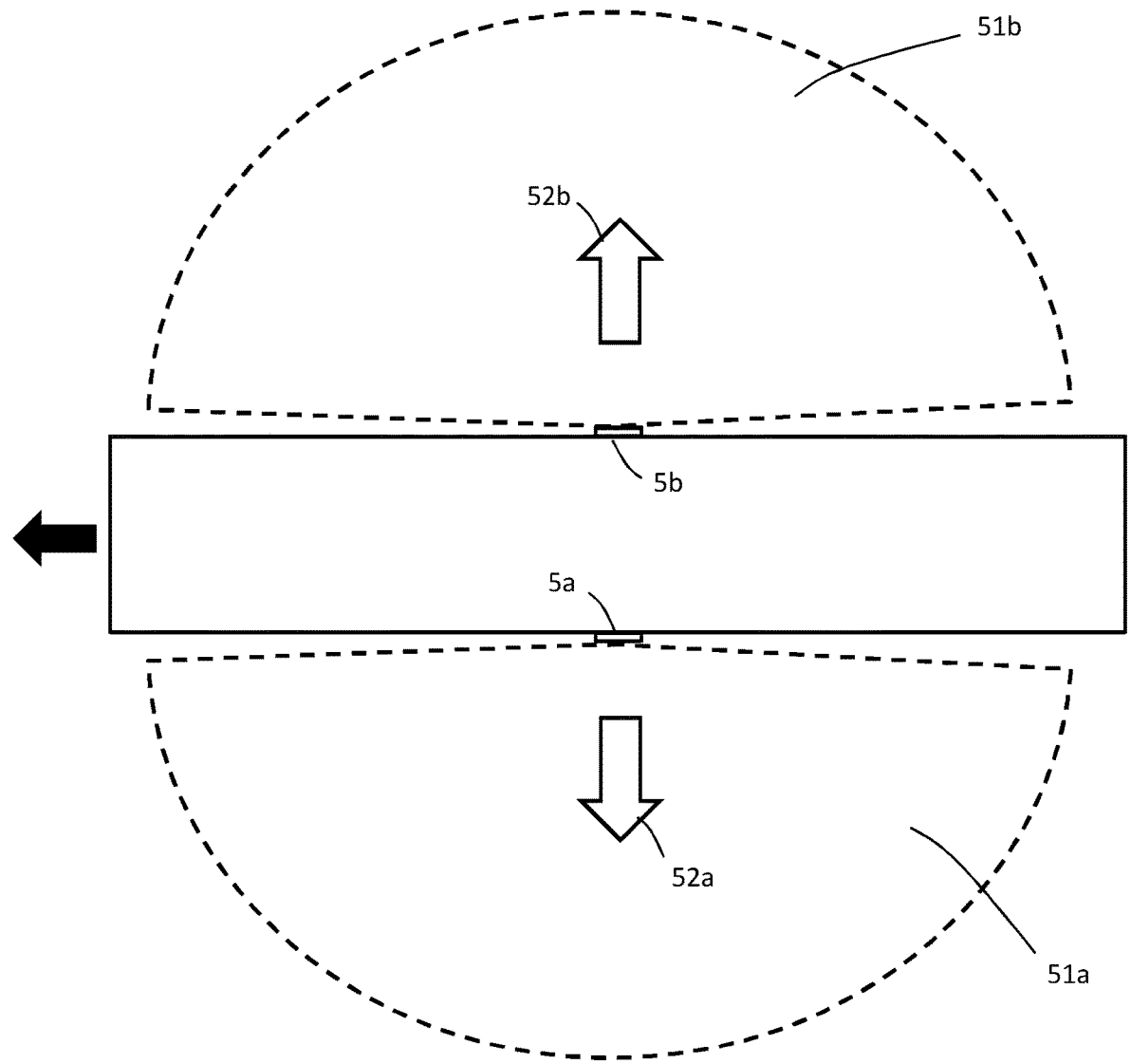
FIG. 6 is a schematic illustration of a top view of general beam directions and antenna sectors for an embodiment having one antenna on each side of the train according to an embodiment of the disclosure.

Optionally, it is also possible to use only one antenna 5a and 5b on each side of the vehicle, as schematically illustrated in FIG. 6. Here, the antennas may be preferably arranged to provide a relatively large antenna sector 51a and 51b. For example, an opening angle as large as 180 degrees, and general beam directions 52a and 52b directed laterally to the left and right. However, smaller antenna sectors may also be used.

Various embodiments of the disclosure may have one or more of the following effects.

In some embodiments, the disclosure may provide a wireless communication system and/or method for ground based vehicles, such as a train, a bus, or a ship. The disclosure may help to alleviate all or at least some of the drawbacks of presently known systems. The disclosure may further provide a means for robust and stable wireless connectivity in ground based transportation vehicles.

In other embodiments, the disclosure may provide a wireless communication system and/or method for a wireless data communication between a wireless communication system in a ground based vehicle and a stationary communication server outside the vehicle, as defined in the appended claims.

According to an embodiment, the disclosure may provide a wireless communication system for a ground based vehicle. The wireless communication system may include a router connected to a plurality of antennas. The router may be configured to transmit and receive a wireless data communication to and from a stationary communication server outside the vehicle through at least one base station of an exterior mobile network via said antennas. The antennas may be directional antennas arranged on planes of the vehicle functioning as ground planes, isolating planes, or absorbing planes. Each plane may extend in a height direction and/or a length direction of said vehicle. At least one antenna may be directed so that its antenna beam covers a laterally directed sector to a first side of the vehicle, and at least one antenna may be directed so that its antenna beam covers a laterally directed sector to a second side of the vehicle. The second side may be opposite to the first side.

The invention may be at least partly based on the arrangement of the antennas on vertical planes functioning as ground planes, isolating planes, or absorbing planes. The antennas on each side of the vehicle may be separated and isolated from each other. As a result, the antennas on each side will only be in communication with base stations on that side of the vehicle, and not with base stations on the other side of the vehicle. The invention may be further based on the implementation of conventional and/or omnidirectional antennas, it may be difficult to obtain increased bandwidth and capacity by using several concurrently useable links operated by the same mobile network operator. Most countries have about three independent radio access networks (e.g., base station networks). If two modems establish connection via the same operator, or via two operators using the same radio access network, the antennas will most likely be connected to the same base station, and the same mobile mast. Here, even though two concurrently useable links are obtained, the two links will compete against each other, and will essentially split the bandwidth that would be available if only one link to the base station was established. Thus, in such cases, the improvement in capacity by using multiple links may be very limited. However, isolating the antennas and sectors from each other would force the links to be established with two different base stations even in cases where the same operator is used. Thus, the transmission rate may be greatly improved by using two concurrently useable links, and many times doubled. In other words, the capacity may be greatly improved by using the antenna and radio strategy of the disclosure.

In an embodiment, the planes may function as ground planes. Here, each plane may include a conductive surface (e.g. of metal), making it reflective to radio frequency (RF) waves. As a result, any RF waves propagating in a backward direction towards the plane may be reflected back in a forward direction.

In another embodiment, the planes may function as absorbing planes. Here, each plane may include a non-conductive surface, which may be made of a material and/or structure to make the surface highly absorptive to RF waves. As a result, any RF waves propagating in a backward direction towards the plane may be absorbed and stopped from propagating past the plane.

In a further embodiment, the planes may function as isolating planes. Here, each plane may include a conductive or non-conductive surface, which may be made of a material and/or structure to prohibit RF wave penetration. As a result, any RF waves propagating in a backward direction and/or towards the plane may be stopped from propagating past the plane.

In some embodiments, the antennas are may be antennas. In the context of the disclosure, is to be understood as an antenna which may radiate or receive greater power in a specific sector than in other sector in the horizontal plane, which may have an angle of 180 degrees or less. Optionally, radiation and reception in other sectors is very limited, or even non-existent, and the antenna essentially only transmits and receives in this sector. As a result, the antennas do not need to provide perfectly directed lobes. With lobes sufficiently directed in the intended, right direction to provide sufficient directivity, and isolation towards other sectors, the antennas may be only connected to base stations in their intended sectors, and not to base stations located in other sectors.

In other embodiments, the planes of the vehicle on which the antennas are arranged may be provided at the exterior side walls of the vehicle. Thus, the vehicle by itself may function as the ground plane, isolating plane, or absorbing plane. The antennas may be arranged directly on the sidewalls, preferably at a relatively high position, such as close to the roof. Alternatively, the antennas may be arranged on a metal plate or the like attached to the sidewalls. The antennas may also be arranged on metallized windows such as those disclosed in WO 2016/013968, which is hereby incorporated in its entirety by reference. By using the vehicle itself as an isolator between the antenna, a very efficient separation and isolation may be obtained at the same way to a very low cost and without any addition to the height of the vehicle.

Optionally, the planes may be provided on sides of an elongate structure extending in a length direction of the vehicle, such as a longitudinal beam. Such a longitudinal beam may be made of metal or with a metallized surface, and may be arranged in the middle of the roof. The beam may have an elongate shape, and extends in the lengthwise direction of the vehicle. The beam may have sufficiently large vertical sides to provide adequate isolation between the antennas on the different sides. The beam may have a height of 10-25 cm and a length of 50-200 cm. The beam may be in an electrically conductive contact with the roof of the vehicle. The provision of antennas on such an elongate structure may be relatively simple to produce and assemble, and may be also easily retrofitted to older vehicles. Further, such antennas may even be implemented with only a limited addition to the height of the vehicle.

The antennas may be made relatively thin, and may extend in a plane parallel to the ground plane, isolating plane, or absorbing plane. For example, the antenna may be a patch antenna. Since the antenna is thin, it may only protrude to a very limited extent to the sides of the vehicle side wall or to the sides of the longitudinal beam on the roof.

The antennas may be cross-polarized, which may simultaneously transmit and receive in two different polarizations. The relative separation and isolation of the sectors for each antenna enables the use of the cross-polarized antennas. Such cross-polarized antennas may be very efficient for a MIMO configuration since the separation may be obtained by polarization diversity instead of spatial separation. In other words, the antennas may be arranged relatively close to each other, which may facilitate mounting and manufacturing.

The antennas may be provided with fixed antenna beam directions. Here, the sectors provided by the antennas may be fixed and static in relation to the vehicle, and may be always directed in the same direction, which may enable the use of cost-efficient antennas and an easy installation and operation. Optionally, the antennas may be patch antennas with orthogonal polarizations. For example, the orthogonal polarizations may be provided as vertical and horizontal polarization. Optionally, the polarization directions may be arranged in slanted dispositions, e.g. in the form of a dual slant configuration such as being arranged in +/−45 degrees orientations. Such arrangement may be patentably desirable if the antennas of the base stations with which the antennas on the vehicle are to communicate with have similar polarization orientations, which is indeed often the case.

Alternatively, the antennas may have steerable antenna beams. Hereby, the beams (e.g., the sectors) may be actively controlled by a controller to be directed to a particular sub-sector within a generally coverable sector. The antenna may be a phased array antenna. However, other implementations are also feasible. For example, a mechanically or electrically moveable antenna mount or physically directing the antenna beam in various directions.

The wireless communication system may include at least two antennas directed so that their antenna beams cover laterally directed sectors to a first side of the vehicle, and at least two antennas directed so that their antenna beams cover laterally directed sectors to a second side of the vehicle. The second side may be opposite to the first side. The sectors for the at least two antennas on each side are at least mostly non-overlapping. Here, the two antennas on each side may be arranged to cover essentially a sector of 90 degrees, one in the forward direction and one in the backward direction, each relating to the movement direction of the train. The two antennas on each side may also connect to different base stations, which may provide a quadrupling of the capacity compared to omnidirectional antennas solution. The sectors for the at least two antennas on each side are optionally non-overlapping.

Configurations of more than two sectors on each side of the vehicle may also be provided, such as three antennas and three sectors on each side, four antennas and four sectors on each side, or more. Configurations of more than two antennas and sectors on each side, such as three or four, may be advantageous if they spread out over a long vehicle, such as being arranged on different carriages of a train.

Antennas operating in differentiated sectors may provide a better capacity, and the narrow sectors may provide a higher gain and better range and coverage. In other words, a more efficient energy utilization.

In case only one sector is provided on each side of the vehicle, the sector may be directed generally perpendicular to the length direction of the vehicle, and may have an opening angle as large as 180 degrees. However, smaller opening angles may be also feasible, and the sector may also be directed non-perpendicularly to the length direction. For example, partially in a forward direction of the vehicle. In case two sectors are used on each side, the opening angle may be 90 degrees or less, and the sectors are preferably directed so that the overlap is minimized. For example, one sector may be directed towards a forward direction of the vehicle, and one sector may be directed towards a backward direction of the vehicle. In case three sectors are used on each side of the vehicle, the sectors may have an opening angle of 60 degrees or less, and may be directed in a forward direction, a direction perpendicular to the length direction of the vehicle, and a backward direction. Similar arrangements may be used when four or more sectors are provided on each side. On a long vehicle, the separation between the sectors may be obtained by arranging the antennas far from each other, and thereby theoretically overlapping sectors may be used, since the spread apart sectors will practically not overlap much.

The sectors may be fixed in relation to the vehicle, but may also be moveable (active directional antennas).

The sectors may be at least mostly non-overlapping, and may be preferably non-overlapping. However, a small amount of overlap may still be acceptable, such as an area overlap of less than 25%, less than 20%, less than 15%, less than 10%, or less than 5%.

The router may be connected to or include a plurality of modems. Each modem may be connected to or connectable to at least one antenna, and preferably at least two antennas. The modems may be preferably capable of establishing several concurrently useable links provided in the two or more sectors.

Optionally, several modems related to mobile network operators using the same radio access network may be provided. Preferably, several modems related to the same mobile network operator may enable establishment of concurrently usable links with the same radio access network and even with the same operator, in different sectors, by connecting to different base stations.

Optionally, more than one modem is connected or connectable to each antenna sector, which may enable a controller in the router to determine and continuously control which modem to use for establishing a communication link for each sector.

The "router" may be a networking router, which is a machine that forwards data packets between computer networks, preferably on at least two data links in each direction. In other words, the networking router may provide data communication between an internal local area network (arranged within the vehicle) and an external wide area network (WAN) outside the vehicle. The router may be a mobile access router (MAR) and/or a mobile access and applications router (MAAR).

In terms of general operation of the communication system, the router and the stationary (remote) communication server may be connected through a plurality of exterior mobile/cellular networks (provided by the base stations), which are simultaneously useable. Also, the router may be arranged to communicate with the stationary communication server on at least two different data links (communication routes) having different characteristics (e.g. on different frequency bands), and then to automatically separate the data traffic between the data links based on an evaluation of link quality. The evaluation of link quality may be carried out by methods disclosed in WO 2015/169917, by the same applicant, which is incorporated herein by reference. The data streams may be then forwarded on one or several links to and from a dedicated external server, which may be referred to as an aggregation server or gateway. The different links thereby form a single virtual link between the router and the gateway.

According to an embodiment, the quality of the available data links may be evaluated on a host layer by repeatedly sending requests arranged to trigger a determinable automated response to the stationary communication server via the data links, measuring the time until the triggered automated responses are received, and assigning data streams to the data links at least partly based on the evaluated quality.

"Data streams" are traffic in need of routing. A stream is in the context of the disclosure may be any communication with a specific combination of ultimate source and ultimate destination IP addresses and network ports, or whatever the equivalent of this would be in a networking scheme where these identifiers are not used or not sufficiently distinguishing.

A stream is "created" when any entity on one side of the system seeks to communicate with any entity on the other side, using any specific combination of ports.

"Requests arranged to trigger a determinable automated response" may be any active sending of a request or other provocation across a network, through a specific link, with the expectation of receiving a predetermined response, and preferably under a timeout or corresponding safeguard. The specific implementation of such requests may vary, depending on what information that should be determined, communication protocols, target host location, the amount of traffic sent and solicited, and the precise limit set by the timeout function.

The router and the stationary server may be connected through a plurality of exterior mobile networks, which are simultaneously useable. Also, the router may be arranged to communicate with the communication server on at least two different data links (communication routes) having different characteristics, and to automatically separate the communication traffic between said data links based on the evaluation. The communication may be automatically optimized based on the evaluation, and also optionally on other conditions such as price, speed, latency, et cetera. Thus, in addition to the evaluation, prioritizing and assignments may be made based on other static or dynamic parameters, such as signal strength and the like. Such further optimizations are further disclosed in EP 1 175 757 by the same applicant, which is hereby incorporated by reference. An automatic selection is then made among the available data links to use the most efficient combination. Hence, a seamless distribution of the data among the different data links may be obtained.

The router may use any available data links, such as two or more of GSM, Satellite, DVB-T, HSPA, EDGE, 1×RTT, EVDO, LTE, WiFi (802.11), WiMAX, or other applicable means, and combine them into one virtual network connection. Specifically, the disclosure may be suitable for use with LTE, and in particular LTE of category 20, and 5G. It may be patentably desirable to use data links provided through wireless wide-area network (WWAN) communication technologies.

The selection may be made once for each data stream. However, re-selection for data streams that have failed may also be made. Further, data streams may also be split among two or more data links, e.g. by transferring a first part of a data stream on one data link to begin with, and then continue the transfer of the rest of the data stream on another data link, based on a re-assignment decision. Re-selection and/or re-assignment may also be made based on criteria other than complete failure of the presently used data link, such as when the evaluated quality of the link presently used is significantly deteriorated, falls below a certain threshold, et cetera.

The assignment of data streams to the data links at least partly based on the evaluated quality may occur in various ways. Optionally, the available data links may be connected to merit values (e.g. integer merit values) based on the evaluated quality, in turn based on the measured test results, and optionally also based on the nominal maximum throughput (NMT) of the links. Optionally, separate merit values may be assigned in each direction of traffic to each link. Links may then be weighed against each other at least partly, and optionally entirely, by these merit values. Thus, in one embodiment, all streams to links may be assigned in linear proportion to the merit values of the links.

The requests triggering a determinable automated response may be requests to a domain name system (DNS) server. A WWAN Internet service provider (ISP) may offer the addresses of one or more domain name system (DNS) servers, as an essential service. DNS queries may be bound to each link, to attempt to resolve a largely arbitrary domain name using one of the ISP's provided servers, or any other. Failure to respond within a given time frame is taken to mean either a general problem transferring the small amount of data, or a more specific problem with the queried DNS server.

Alternatively, the request triggering a determinable automated response may use the ICMP protocol. In particular, it may be preferred that the requests triggering a determinable automated response are ECHO_REQEST datagrams, used to trigger an ECHO_RESPONSE from an arbitrary remote host. Further, the ECHO_REQESTs may be provided with a variable amount of extra padding data. Such an echo request is often referred to as "ping" or "pinging".

The evaluation and selection of data links may additionally or alternatively be based on other performance parameters, where the performance parameters may be measured and evaluated by the controller, in order to distribute data streams between the available links. The performance parameters may include at least one of: packet loss (intermittent failure for packets of data to arrive), latency (round-trip response time, hence responsiveness), throughput/bandwidth (overall rate of data transmission, whether current or potential), and a variety of radiophysical metrics, such as signal strength. The data streams may be then forwarded on one or several links to and may be forwarded to a dedicated external server, which may be referred to as an aggregation server or gateway. The different links may thereby form a single virtual link between a router and the gateway.

The router may be provided as a single router arranged somewhere in the vehicle and optionally at a relatively central location. The router may comprise modems and SIM-cards as an integrated part of the router. However, the modems and/or SIM-cards may alternatively be arranged external from the router and be connected to the router by wired or wireless connections. For example, it is possible to arrange the modems near the antennas.

The router may also be provided in the form of a plurality of routers being connected together to form a distributed router system, as disclosed in US 2018/0020334 by the same applicant, which is hereby incorporated by reference. For example, one or more routers may be arranged in each carriage.

One or several internal LAN(s) may be provided inside the moving vehicle for providing (wireless) communication between each router and at least one client (sometimes referred to as terminal) onboard. In an embodiment, each internal LAN may provide Wi-Fi communication between the router and at least one client onboard the moving vehicle. If several carriages are provided, each carriage may be associated only with one internal LAN provided by one router. Thus, at least one wireless access point may be arranged inside the vehicle.

The router includes (or is connected to) a plurality of modems for communication with the at least one exterior mobile network. Here, each modem is connectable to at least two external antennas in order to enable a MIMO communication. Thus, the router may comprise several antenna ports per modem, enabling a MIMO for the external communication, and the high bandwidth thereby provided may be then distributed to the internal clients by. 802.11n protocols. The modems may share a plurality of antennas. Each one of the antennas may be optionally useable by only one modem at the time.

Moreover, the router may further include a subscriber identity module (SIM) pool including a plurality of SIMs. The controller may be capable of periodically assigning SIMs within the SIM pool to any one of the plurality of modems. By including a SIM pooling capability in the system, the number of SIM cards (SIMs), the number of modems in the system may be reduced. By using a common pool of SIMs accessible to each of the plurality of routers, the total number of SIMs may be reduced and the SIMs available may be used more efficiently. At the same time, the accessibility for each modem to an adequate SIM at each time increases since the number of accessible SIMs may be managed more efficiently. The term "periodically" is here used to indicate an assignment which is not fixed, but which is established temporarily, for a certain period of time. As a result, it may be possible to provide access for each router to one or several suitable SIM(s) in every country in which the vehicle may travel. Pooling of SIM cards is further disclosed in EP 2 518 977 by the same applicant, which is hereby incorporated by reference.

In the above-discussed SIM pool embodiment, the SIM cards forming the SIM pool may be arranged in the router(s). Alternatively, the SIM pool may be arranged at another unit on-board the vehicle. This allows any modem to use any SIM card. Still further, the SIM pool may be arranged outside the vehicle. Such an embodiment may be referred to as remote SIM with central SIM pool. The SIM cards for pooling in the above-discussed embodiments may require physical SIM cards arranged locally or centrally. However, software SIMs, also referred to as E-SIM, soft SIM, or virtual SIM, may also be used.

In some embodiments, the disclosure may provide a method for a wireless data communication between a wireless communication system in a ground based vehicle and a stationary communication server outside the vehicle. The method may include the following steps: (1) providing a router within the vehicle, the router being connected to a plurality of directional antennas and configured to transmit and receive a wireless data communication to and from the stationary communication server outside the vehicle through at least one base station via said directional antennas; (2) providing said antennas on planes of the vehicle functioning as ground planes, isolating planes, or absorbing planes, each plane extending in a height direction and/or a length direction of said vehicle; (3) directing at least one antenna so that its antenna beam covers a laterally directed sector to a first side of the vehicle; and (4) directing at least one antenna so that its antenna beam covers a laterally directed sector to a second side of the vehicle, the second side being opposite to the first side.

The router may be provided in various ways, such as in a single unit, or in multiple unit, forming a distributed router system. Further, any number of antennas and corresponding antenna sectors may be provided on either side of the vehicle. Still further, the antenna sectors may be entirely non-overlapping, but various degrees of overlap may also be implemented. Such and other modifications are within the scope of the disclosure, as it is defined by the appended claims.

It is noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A wireless communication system for a ground based vehicle, comprising a router connected to a plurality of antennas, wherein:
the router is configured to transmit and receive a wireless data communication to and from a stationary communication server outside the ground based vehicle through at least one base station of an exterior mobile network via the plurality of antennas;
the plurality of antennas are directional antennas arranged on planes of the ground based vehicle functioning as ground planes, isolating planes, or absorbing planes, the planes being provided on opposite sides of a longitudinal beam, the longitudinal beam extending in a length direction of the ground based vehicle and arranged on the roof of said ground based vehicle;
each of the planes on the sides of the longitudinal beam extending in both a height direction and a length direction of the ground based vehicle;
at least one of the plurality of antennas is directed so that its antenna beam covers a laterally directed sector to a first side of the ground based vehicle; and at least another one of the plurality of antennas is directed so that its antenna beam covers a laterally directed sector to a second side of the ground based vehicle, wherein the second side is opposite to the first side.

2. The wireless communication system of claim 1, wherein the planes of the ground based vehicle are provided at exterior side walls.

3. The wireless communication system of claim 1, wherein the antennas are cross-polarized, thereby simultaneously transmitting and receiving in two different polarizations.

4. The wireless communication system of claim 1, wherein the antennas are provided with fixed antenna beam directions.

5. The wireless communication system of claim 1, wherein the antennas are patch antennas with orthogonal polarizations.

6. The wireless communication system of claim 1, wherein the antennas have steerable antenna beams.

7. The wireless communication system of claim 6, wherein the antennas are phased array antennas.

8. The wireless communication system of claim 1, wherein:
- at least two of the plurality of antennas are directed so that their antenna beams cover laterally directed sectors to the first side of the ground based vehicle;
- at least another two of the plurality of antennas are directed so that their antenna beams cover laterally directed sectors to the second side of the ground based vehicle;
- the second side is opposite to the first side; and
- the laterally directed sectors to the first side of the ground based vehicle and the laterally directed sectors to the second side of the ground based vehicle are at least mostly non-overlapping.

9. The wireless communication system of claim 8, wherein the laterally directed sectors to the first side of the ground based vehicle and the laterally directed sectors to the second side of the ground based vehicle are non-overlapping.

10. The wireless communication system of claim 1, wherein the router comprises a plurality of modems for communication with at least one exterior mobile network.

11. The wireless communication system of claim 1, wherein the router is connected to a plurality of modems for communication with at least one exterior mobile network.

12. The wireless communication system of claim 1, wherein:
- the router comprises at least one modem for communication with the exterior mobile network; and
- the at least one modem is connectable to at least two of the plurality of antennas to enable a multiple input multiple output (MIMO) communication.

13. The wireless communication system of claim 1, wherein:
- the router comprises a plurality of modems for communication with the exterior mobile; and
- each of the plurality of modems connects to at least two of the plurality of antennas to enable a multiple input multiple output (MIMO) communication.

14. The wireless communication system of claim 1, wherein the ground based vehicle is a train.

15. A method for enabling wireless data communication between a wireless communication system in a ground based vehicle and a stationary communication server outside the ground based vehicle, comprising the steps of:
(i) providing a router within the ground based vehicle, the router being connected to a plurality of directional antennas and configured to transmit and receive a wireless data communication to and from the stationary communication server outside the ground based vehicle through at least one base station via the plurality of directional antennas;
(ii) providing the plurality of directional antennas on planes of the ground based vehicle functioning as ground planes, isolating planes, or absorbing planes, the planes being provided on opposite sides of a longitudinal beam, the longitudinal beam extending in a length direction of the ground based vehicle and arranged on the roof of said ground based vehicle; wherein each of the planes on the sides of the longitudinal beam extends in both a height direction and a length direction of the ground based vehicle;
(iii) directing at least one of the plurality of directional antennas so that its antenna beam covers a laterally directed sector to a first side of the ground based vehicle; and
(iv) directing at least another one of the plurality of directional antennas so that its antenna beam covers a laterally directed sector to a second side of the ground based vehicle, wherein the second side is opposite to the first side.

16. The wireless communication system of claim 1, wherein the planes of the longitudinal beam are made of metal or are metallized.

17. The wireless communication system of claim 1, wherein the longitudinal beam has a height in the range of 10-25 cm, and a length in the range of 50-200 cm.

18. The wireless communication system of claim 1, wherein the beam is in electrically conductive contact with the roof of the vehicle.

* * * * *